United States Patent [19]

Misencik et al.

[11] Patent Number: 5,136,460
[45] Date of Patent: Aug. 4, 1992

[54] ELECTRICAL SYSTEM SURGE PROTECTOR

[75] Inventors: John J. Misencik, Shelton; Russell T. Borona, Seymour, both of Conn.

[73] Assignee: Hubbell Incorporated, Orange, Conn.

[21] Appl. No.: 511,703

[22] Filed: Apr. 20, 1990

[51] Int. Cl.⁵ .............................................. H02H 7/00
[52] U.S. Cl. ....................................... 361/117; 361/56
[58] Field of Search .............................. 361/117–119, 361/56, 104, 111, 58, 394, 399

[56] References Cited

U.S. PATENT DOCUMENTS

| | | | |
|---|---|---|---|
| 4,023,071 | 5/1977 | Fussell | 361/56 |
| 4,271,446 | 6/1981 | Comstock | 361/56 |
| 4,455,586 | 6/1984 | McCartney | 361/56 |
| 4,899,257 | 2/1990 | Yamamoto | 361/394 |
| 4,912,590 | 3/1990 | Misencik et al. | 361/56 |
| 4,939,618 | 7/1990 | Fingerson et al. | 361/56 |
| 5,010,438 | 4/1991 | Brady | 361/56 |

Primary Examiner—Geoffrey S. Evans
Attorney, Agent, or Firm—Jerry M. Presson; Alfred N. Goodman

[57] ABSTRACT

A whole house surge protector is provided in a single unit in association with a 4-wire wiring system with surge suppression between each of two hot conductors and respective neutral and ground conductors and also between the two hot conductors. The unit is in an insulating housing securable merely by a threaded nipple directly with a load center for protection on a multiplicity of circuit branches.

17 Claims, 4 Drawing Sheets

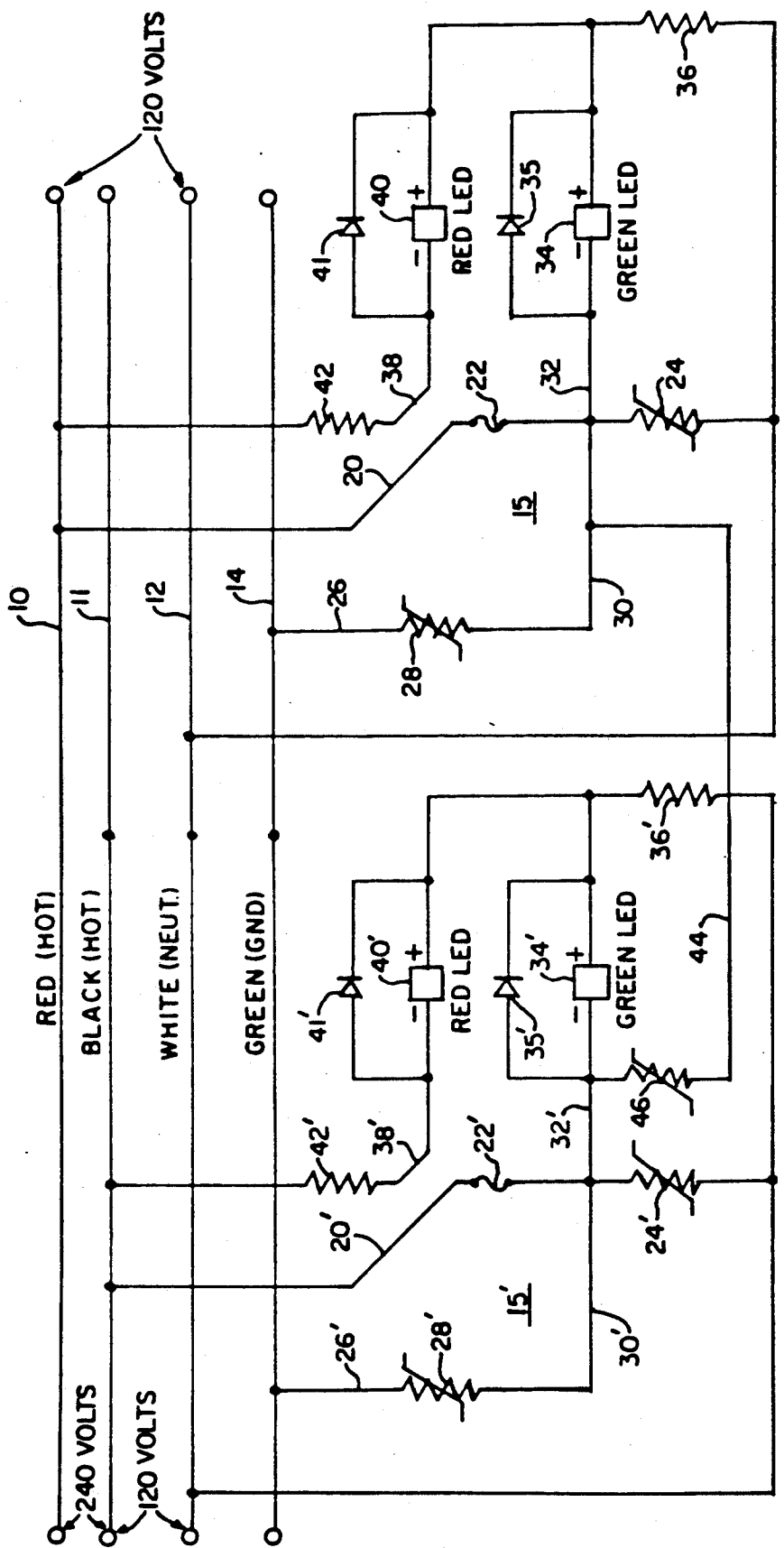
FIG. I.

ELECTRICAL SYSTEM SURGE PROTECTOR

BACKGROUND & SUMMARY OF THE INVENTION

This invention relates to apparatus for the protection of loads connected with an electrical distribution system and particularly to such apparatus to protect loads connected with a 3-wire or 4-wire wiring system.

Misencik et al. patent application Ser. No. 345,929, May 1, 1989, now U.S. Pat. No. 4,912,590, discloses an electrical surge suppressor circuit along with dual indicators for showing the condition of the surge suppressor elements. That circuit is amenable to fabrication and assembly economically and compactly so it is well suited for incorporation in household and commercial wiring devices such as receptacles. The description of the apparatus of the copending application is incorporated herein by reference. Other forms of electrical surge suppressor and indicator apparatus have been incorporated in household and commercial receptacles in recent years. A surge suppressor receptacle is effective only in the protection of loads plugged into that receptacle.

Among the objects of the present invention are to provide a system surge protector that has components for surge suppression of both sides of a 4-wire wiring system. In common household and commercial wiring, the wiring system has four conductors including two hot conductors denominated the "red" and "black" conductors, plus a neutral or "white" conductor and a ground or "green" conductor. Conventionally, a voltage of about 120 volts is provided between each of the hot conductors and the neutral conductor with about 240 volts presented across the two hot conductors. Some loads are connected across one hot conductor and the neutral conductor. Some other loads are connected across the two hot conductors. In accordance with the present invention there is provided a surge protector for protecting all of such loads, including those associated with one hot conductor and the neutral conductor as well as loads connected to the two hot conductors.

Furthermore, the circuit elements of the invention are arranged within a housing of insulating material configured with a tubular threaded nipple adapted to extend through a hole in a load center or other electrical enclosure for allowing the wires of the wiring system to be connected with the surge protector. Therefore, the combination of such a surge protector with a load center effectively provides total household surge protection.

Certain aspects of the invention apply to total household surge protection for 3-wire systems, i.e., 120 volt systems with one hot conductor, a neutral conductor and a ground conductor. Protection is also provided even if no ground conductor is used for loads connected between the hot conductors or hot to neutral.

In an embodiment of the invention, the surge protector contains a surge protector circuit in accordance with the above-mentioned copending application that is duplicated for each of the half circuits of the system, represented by each hot conductor and the neutral and ground conductors. In addition, a suppression element is present for surge suppression directly between the two hot conductors.

Also in an embodiment of the invention, the housing for the protector is a box-like container including an insulating base and cover defining a compartment therebetween containing a surge suppression circuit. The base and cover are opposing, clamshell-like, elements defining the compartment and having the tubular nipple extending from an end wall thereof. In use, the nipple extends through a hole as provided by a knock out in a conventional load center or other similar electrical enclosure containing wiring of a system to be protected by the surge protector. The box is secured by a nut on the inside wall of the load center that is threaded onto the nipple. No other attachment is required to support the box on the enclosure.

THE DRAWING

FIG. 1 is a circuit schematic of a surge protector in accordance with an embodiment of the present invention;

PREFERRED EMBODIMENTS

Figure 3:
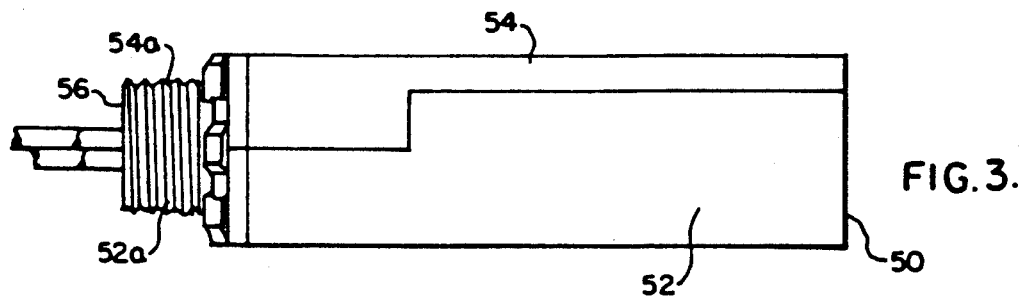
FIG. 2 and FIG. 3 are respective plan and elevation views of a housing for a system surge protector that may contain surge protector components as illustrated in FIG. 1.

Referring to FIG. 1, there is shown an electrical circuit schematic of an embodiment of the present invention. This embodiment applies the teachings of the before-mentioned patent application to each half circuit of a 4-wire distribution system and in addition provides surge suppression between the hot conductors. The conductors include two hot conductors 10 and 11, a neutral conductor 12, and a ground conductor 14.

In the right-hand portion of the drawing of FIG. 1 is shown a suppressor circuit 15 for a first hot conductor 10, referred to as the red conductor, in relation to the neutral or white conductor 12 and the ground or green conductor 14. A first surge suppressor circuit branch 20 includes a fuse 22 and a first varistor 24 connected between the red, hot conductor 10 and the white, neutral conductor 12. A second surge suppressor circuit branch 26 includes the same fuse 22 in series with a second varistor 28 connected between the red, hot conductor 10 and the green, ground conductor 14. In addition, a third surge suppressor circuit branch 30 includes a combination of the two before-mentioned varistors 24 and 28 between the neutral and ground conductors 12 and 14. Therefore, the components 22, 24 and 28 are each presented in more than one of the circuit branches 20, 26 and 30.

The right-hand portion of the protector circuit of FIG. 1 also has a first, green, indicator circuit portion 32 for indicating power is on and surge protection is present. The first indicator circuit portion includes a first indicator device such as a green light emitting diode or LED 34 energized when the fuse is intact. The green indicator circuit branch has a current limiting resistor 36 connected in series with the indicator 34.

A red indicator circuit portion 38 includes an indicator 40 such as a red LED connected in series with a second resistor 42 as well as the first resistor 36 that is also included in the green circuit portion. The series combination of the red indicator 40 and the resistors 36 and 42 is connected in shunt relation to the fuse 22. Suitable examples for the fuse 22, LED's 34 and 40, their secondary diodes 35 and 41 connected in inverse parallel relation, as well as the varistors 24 and 28, can be found by reference to the copending application. A discussion follows this description of FIG. 1 regarding ways varistors can be used in parallel combination to provide a desired protection level.

In the left-hand portion 15' of the circuit of FIG. 1 is essentially a duplicate of the suppression and indicator circuit is of the right-hand portion now applied to the black, hot conductor 11 and the neutral and ground conductors 12 and 14. Elements in the left-hand circuit portion corresponding to those of the right-hand circuit portion are given the same reference numerals with a prime.

In addition, the protector circuit has a protection circuit branch 44 between the red and black hot conductors 11 and 12 that comprises both of the fuses 22 and 22' and a varistor 46.

The circuit of FIG. 1 therefore represents a whole house surge protector for a 4-wire system such as one presenting 120 volts, 60 hertz, between each of the hot conductors 10 and 11 and the neutral conductor 12 or ground conductor 14 (normal mode protection) plus protection between the ground and neutral (common mode protection) as well as a level of 240 volts, 60 hertz, between the two hot conductors 10 and 11. The various leads connected to the wiring system can be understandably combined so that the total circuit package requires only four conductors to extend from the protector circuit to the wiring system, i.e., for each of the two hot conductors, the neutral conductor and the ground conductor.

In the right and left-hand portions of the circuit are depicted means 15 and 15' for half circuit surge suppression on circuit branches 20, 26, 30, 20', 26' and 30' connected between each of the two hot conductors and the respective neutral and ground conductors. Also, the additional circuit branch 44 provides means for full circuit surge suppression and is connected between the two hot conductors 10 and 11.

It will be apparent that the exemplary embodiment of FIG. 1 with respect to the specific indication means and the specific manner of providing the varistor elements, for example, may be varied from that shown while still achieving the required full complement of protection functions.

As shown in FIG. 1, varistors 24 and 28 (like 24' and 28') are connected together to provide a ground to neutral surge suppressor without a separate, third, varistor element provided between the ground and neutral. This economizes on component cost and space. As described in the copending application, varistors 24 and 28 are preferably two disks combined physically in a single package having three leads to achieve the required functions in a markedly compact and economical manner.

A desired protection level at a certain voltage and joule rating for the varistor can be achieved either by selecting a single disk of sufficient size for the desired rating or by paralleling two smaller disks. The latter is sometimes preferred for economy. Indeed, that practice is employed in the circuit of FIG. 1 where the varistor combination 24 and 28 is in parallel with varistors 24' and 28' between the ground and neutral conductors 14 and 12. In use of components as described in the copending application, each varistor 24 or 28 is suitably one having 45 joules energy storage capacity and a breakover voltage of 212–214 v. at 1 ma. Such varistors 24 and 28, when used alone, provide a protection level of approximately 1000 v., at 6000 v. bi-wave transient test voltage level, between the conductors 12 and 14. That is quite satisfactory in many applications. In some applications or markets, a lower protection level is desired. Use of the second set of varistors 24' and 28' in parallel with 24 and 28 reduces the level at which surge voltages are clipped to about 750 v. or less.

Furthermore, the basic circuit 15 when used alone can have the varistors parallel with a second set so the former clipping level of about 525 v. for hot to neutral or hot to ground is reduced to about 470 v.

Varistor 46 may be as a single element but is suitably two paralleled disks, each having a 250 v. protection level and 80 joules energy capacity for a combined energy capacity of about 160 joules.

A surge protector in accordance with this invention, such as that of FIG. 1, may be physically assembled in a variety of configurations of which one will be described with reference to FIGS. 2 through 7. Among the objectives are to provide a protector that can be made simply, economically and reliably so as to be suitable for widespread application as a whole house protector.

Figure 2:
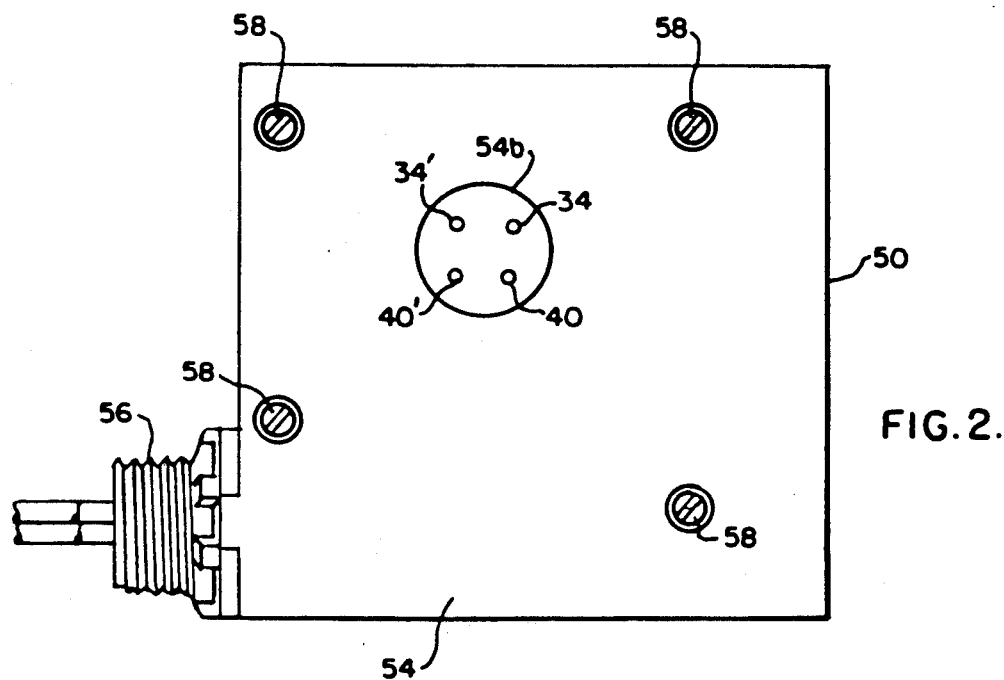

FIGS. 2 and 3 give exterior views of a housing 50 for a circuit such as that of FIG. 1 that is suitable for these objectives. The housing 50 for the protector is a box-like container including an insulating base 52 and an insulating cover 54 defining a compartment therebetween containing the protector circuit. The housing 50 is relatively flat so that the base 52 affords ready access for the placement of components therein when the cover is not yet in place. The housing has a tubular, threaded, nipple 56 extending from a side wall and adapted to extend through a hole in an enclosure of an electrical supply unit such as a load center or electrical junction box wherein the conductors extend from the nipple for connection to wiring within such an enclosure. The housing 50 has high reliability because it is electrically insulating and it is convenient to use because it only requires the wiring to be attached and a nut applied to the threaded nipple 56. Other forms of surge suppression circuits may also be used within such a housing for system protection.

The housing 50 of this embodiment is of two pieces 52 and 54 of molded insulating material that fit together in a more or less clamshell-like arrangement (but not hinged in this embodiment) and are held by fasteners 58 at fastener openings through the cover 54 that extend into fastener posts or bosses within the base 52. The wiring nipple 56 is shown as having a portion 54a integral with the cover 54 and a portion 52a integral with the base 52. The nipple is in this example a threaded element that would fit within an enclosure and would be secured thereto by a nut or the like applied from within the enclosure and would be all the support required for the unit.

FIG. 2 shows a window 54b, such as one provided by clear plastic, set within the top surface of the cover to allow viewing of the LED's 34, 34', 40 and 40' contained in the housing.

Figure 4:
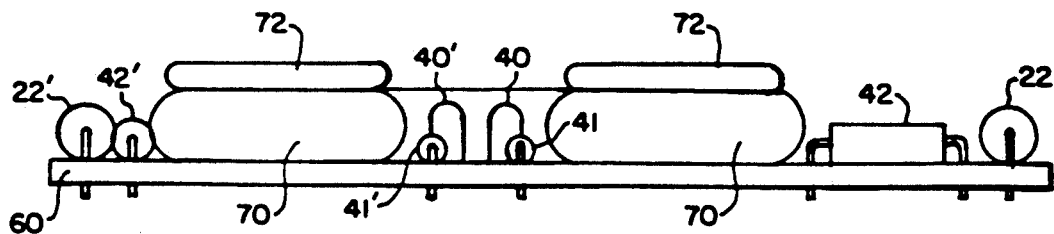
FIG. 4 is a side elevation view of a printed circuit board bearing the circuit of FIG. 1.
Figure 5:
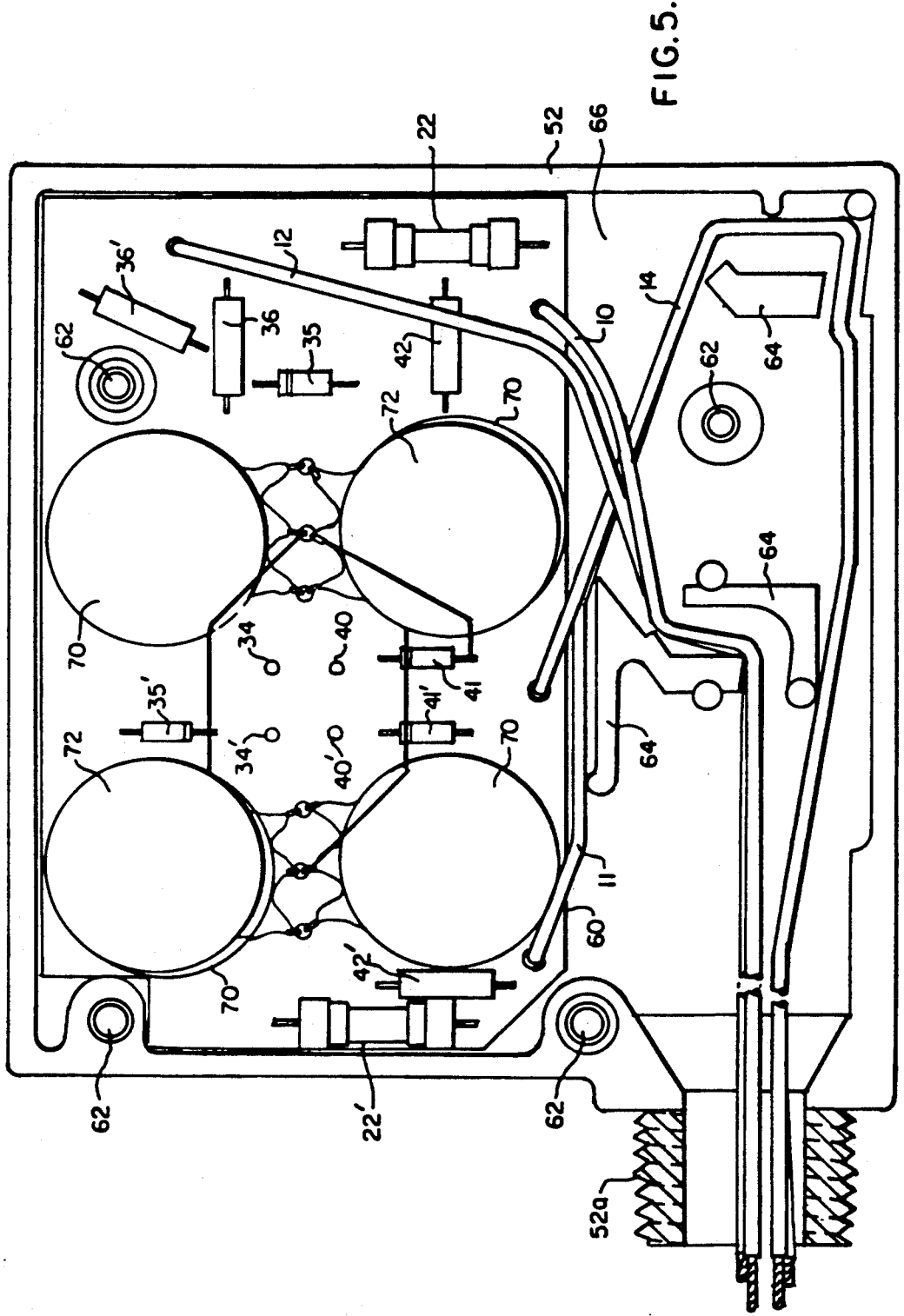
FIG. 5 is a plan view of the printed circuit board of FIG. 4 within the base of the housing of FIGS. 2 and 3.

FIGS. 4 and 5 illustrate the component side of a printed circuit board 60 containing components as depicted in the circuit of FIG. 1. In FIG. 4, the circuit board is viewed in elevation with its components on it but not in place within the housing. In FIG. 5, the board 60 is viewed in plan in place within the base of the housing showing the orientation of the board 60 within the base with respect to some of the structural features of the base including fastener bosses 62 and guides 64 for orienting the board 60 and the wiring 10, 11, 12 and 14 that proceeds from the board through the nipple to the exterior of the unit. The components are labeled in a manner consistent with those of FIG. 1. The bosses 62 and guides 64 are integrally molded with the rest of the base 52 and extend upward from the bottom flat surface 66 of the base 52.

The varistors in the embodiment of FIGS. 4 and 5 are four, three leaded varistor packages 70 and two, two leaded varistors 46. Each of the varistor packages 70 includes two disks for varistors 24 and 28 (or 24' and 28') of the circuit. Two of the packages 70 are connected in parallel for each of the right hand and left hand circuit portions 15 and 15'. The varistors 46 are connected in parallel for the within branch 44 of FIG. 1. Despite the extra varistors in parallel, it is seen that the circuit is compactly arranged. For example, a housing that is about 3½ in. by 3½ in. by 1 in. is adequate. The relatively flat configuration aids the assembly of the unit. An overall depth of no more than about 1 in. is preferred.

It is seen that all of the indicator elements 34, 34', 40 and 40' are, in this example, located proximate each other on a portion of the board which is visible through window 54b of the cover 54 of the housing 50.

Figure 6:
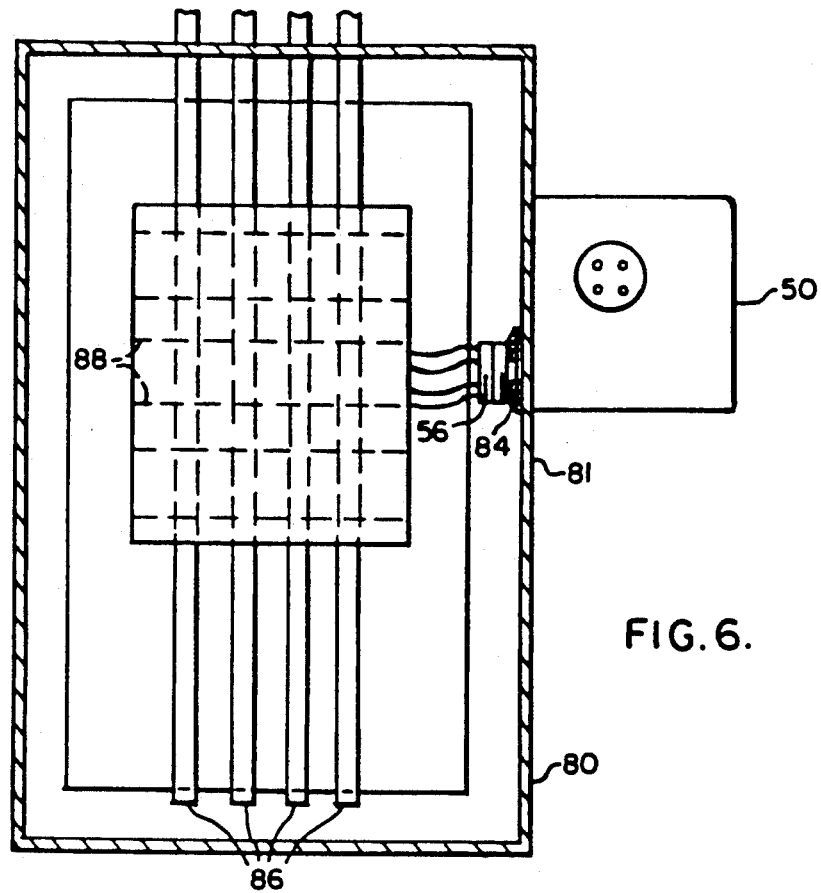
FIGS. 6 and 7 are views, partly in section, of combinations of a surge protector in combination with a load center and in combination with an electrical junction box, respectively, in accordance with embodiments of the present invention.
Figure 7:
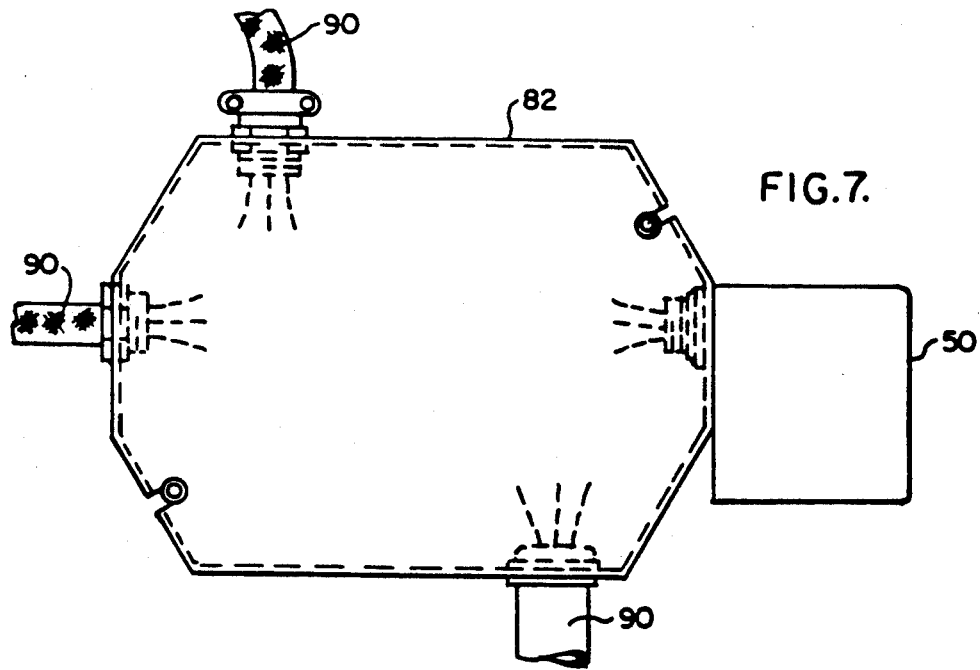

FIGS. 6 and 7 illustrate respectively the protector in a housing 50 as in the foregoing embodiment associated in combination with a load center 80 and an electrical junction box 82. In the view of FIG. 6, the protector is shown having the nipple 56 extending through a sidewall 81 of the load center as would normally be provided by knock-outs on such an enclosure. A nut 84 is provided to secure the unit on the load center wall 81 and the wiring 10, 11, 12, 14 from the protector extends to the bus bars 86 or other conductors within the load center 80 that are associated with any of a number of circuit breakers 88 within the load center. As such, the protector unit 50 provides protection for all of the circuits associated with the load center 80 and thus is a very effective yet economical way of providing surge protection functions for a variety of loads or a large number of loads. Surge suppressor receptacles on individual circuit branches may still be provided for protection against local surges but the unit 50 will take care of external power line surges such as due to lightening and the like.

In the embodiment of FIG. 7, it is illustrated that the protector unit 50 can be equally well associated with another form of electrical enclosure if desired. The enclosure illustrated therein has three other wiring conduits 90 connected to the box 82 and located therein by wiring nipples extending through sidewalls of the box. Therefore, a unit 50 as described provides a high degree of versatility in its application.

It is therefore seen that a unique application of existing surge suppressor technology, such as that of the aforementioned pending application, can result in a household surge protector of widespread applicability because of its relative economy while affording protection of all electrical loads that would otherwise be subject to damage by external surges. Furthermore, by the specific embodiment illustrated, there is positive indication of the status of the protection.

While disclosed in certain forms only, the invention may be varied from the embodiments illustrated in accordance with ordinary skill in surge suppression and wiring systems.

We claim:

1. A system surge protector for at least a 3-wire wiring system comprising:
    at least three conductors for respective connection with wires of the system and including at least one hot conductor, a neutral conductor and a ground conductor;
    surge suppression means comprising a first surge suppressor circuit branch extending between said at least one hot conductor and said neutral conductor and a second surge suppressor circuit branch extending between said hot conductor and said ground conductor; and
    a housing comprising a box-like container including an insulating base and a cover defining a compartment therebetween containing said surge suppression means;
    said housing having a tubular nipple extending from an end wall and adapted to extend through a hole in a load center enclosure, said conductors extending from the nipple for connection to wiring within said load center enclosure.

2. A protector according to claim 1 and further comprising
    a load center enclosure connected to said protector.

3. A protector according to claim 2 wherein
    said housing is secured to the load center enclosure by said tubular nipple being threaded and extending through an opening in said load center enclosure and a nut applied to said threaded nipple from within the enclosure.

4. A protector according to claim 1 and further comprising
    fuse means for opening said circuit branches of said surge suppression means upon a failure of the surge suppression means, said fuse means being positioned in said first and second circuit branches; and
    indicator means for indicating the status of said surge suppression means.

5. A protector according to claim 4 wherein
    said fuse means comprises a fuse connected to said hot conductor in said first and said second circuit branches,
    said fuse being connected to a first metal oxide varistor, said first varistor being connected between said fuse and said neutral conductor, and
    said fuse further being connected to a second metal oxide varistor, said second varistor being connected between said fuse and said ground conductor of the system.

6. A protector according to claim 4 and further comprising
    indicator means for indicating the status of the surge suppression means.

7. A protector according to claim 6 wherein:
    the housing cover has a clear window for viewing the indicator means.

8. A protector according to claim 7 and further comprising
    said surge suppression means, said fuse means, and said indicator means being located on a printed circuit board located on a base of the housing.

9. A system surge protector for a fourwire wiring system comprising:
- an insulating housing with means for attachment to a wall of an electrical load center enclosure;
- four conductors for respective connection with each wire of said four-wire wiring system and including first and second hot conductors, a neutral and a ground conductor; and
- surge suppression means comprising
  - a first surge suppressor circuit connected to said first hot conductor and including a first surge suppressor circuit branch connecting said first hot conductor to said neutral conductor and a second surge suppressor circuit branch connecting said first hot conductor to said ground conductor;
  - a second surge suppressor circuit, separate from said first surge suppressor circuit, connected to said second hot conductor and including a first surge suppressor circuit branch connecting said second hot conductor to said neutral conductor and a second surge suppressor circuit branch connecting said second hot conductor to said ground conductor;
  - full circuit surge suppression means connected to said first and second hot connector to protect against surges between said hot conductors;
  - said housing comprising a box-like container including an insulating base and a cover; and
  - said means for attachment comprising means adapted to pass through said wall of said electrical load center enclosure, said conductors extending from said housing through said wall for connection to wiring within said load center enclosure.

10. A system surge protector for a fourwire wiring system comprising:
- an insulating housing with means for attachment to an electrical load center enclosure;
- four conductors for respective connection with each wire of said four-wire wiring system and including first and second hot conductors, a neutral conductor and a ground conductor; and
- surge suppression means comprising
  - a first surge suppressor circuit connected to said first hot conductor and including a first surge suppressor circuit branch connecting said first hot conductor to said neutral conductor and a second surge suppressor circuit branch connecting said first hot conductor to said ground conductor;
  - a second surge suppressor circuit connected to said second hot wire and including a first surge suppressor circuit branch connecting said second hot conductor to said neutral conductor and a second surge suppressor circuit branch connecting said second hot conductor to said ground conductor, and
  - full circuit surge suppression means connected to said first and second hot connector to protect against surges between said hot conductors,
  - said first surge suppressor circuit comprising a first fuse connected to said first hot conductor, a first surge suppressor element connecting said first fuse to said neutral conductor, and a second surge suppressor element connecting said fuse to said ground wire,
  - said second surge suppressor circuit comprising a second fuse connected to said second hot conductor, a third surge suppressor element connecting said second fuse to said neutral conductor, and a fourth surge suppressor element connecting said fuse to said ground conductor,
  - said full circuit surge suppression means comprising a fifth surge suppressor element connected between said first and second fuses of said first and second circuits.

11. A protector according to claim 10 and further comprising
- status indicator means for visually indicating the condition of said first and second surge suppressor circuit.

12. A protector according to claim 10 wherein
- said surge suppressor elements of each surge suppressor means are connected to parallel with each other.

13. A protector according to claim 10 wherein
- said surge suppressor elements comprise a single package with two metal oxide disks in parallel with leads from two outer surfaces of said metal oxide disks and a lead from adjacent inner surfaces of the disks.

14. A protector according to claim 10 and further comprising
- dual status indicator means connected to said first and second fuses of said surge suppression means to provide positive indication when power is on and surge protection is present and for positive indication when power is on and surge protection is lacking.

15. A protector according to claim 14 wherein
- said insulating housing comprises a base and a cover forming a relatively flat container with a printed circuit board disposed against a bottom of the base, said surge suppression means and the dual status indicator means being mounted on the printed circuit board.

16. A protector according to claim 15 wherein:
- the cover has a viewing window over indicator elements of the dual status indicator means.

17. A protector according to claim 15 wherein
- said insulated housing comprises a threaded nipple integrally molded with said base, said nipple extending from an end wall of the housing for attachment to an electrical load center enclosure and for the conductors to extend therefrom for connection within the enclosure.

* * * * *